United States Patent [19]
Jenne

[11] 3,967,237
[45] June 29, 1976

[54] AUTOMOTIVE SEAT BELT MONITORING SYSTEM

[75] Inventor: Richard L. Jenne, Attleboro, Mass.

[73] Assignee: Texas Instruments Incorporated, Dallas, Tex.

[22] Filed: Nov. 1, 1974

[21] Appl. No.: 520,188

[52] U.S. Cl. .............................. 340/52 E; 340/278; 307/10.5 B
[51] Int. Cl.² .......................................... B60R 21/10
[58] Field of Search .......................... 340/52 E, 278; 307/10.5 B; 180/82 C

[56] References Cited
UNITED STATES PATENTS

| | | | |
|---|---|---|---|
| 2,924,817 | 2/1960 | Dawkins et al. ................ | 340/52 E X |
| 3,340,523 | 9/1967 | Whitman ............................ | 340/278 |
| 3,665,385 | 5/1972 | Booth ................................ | 340/52 E |
| 3,757,293 | 9/1973 | Petersen ............................ | 340/52 E |

Primary Examiner—Alvin H. Waring
Attorney, Agent, or Firm—John A. Haug; James P. McAndrews; Russell E. Baumann

[57] ABSTRACT

A system for monitoring usage of seat belt means in a motor vehicle includes electrically operable visual signaling means and electrically operable audible signaling means. A first switch is operable in response to initiation of motor vehicle operation for connecting the signaling means to an electrical power supply in the vehicle. An additional switch is operable in response to fastening of the vehicle seat belt means for preventing operation of the audible signaling means. An electrical resistor of positive temperature coefficient of resistivity is arranged to be heated to a selected temperature with a selected time delay after initiation of motor vehicle operation for preferably terminating operation of both signaling means after such time delay even if the vehicle seat belt means are not fastened.

13 Claims, 4 Drawing Figures

AUTOMOTIVE SEAT BELT MONITORING SYSTEM

The use of seat belt means in motor vehicles has not been as widespread as might be desired and accordingly a number of seat belt monitoring systems have been used or proposed for use to remind vehicle occupants to use the vehicle seat belts. Such monitoring systems have included audible and visual signaling means which remind the vehicle occupants if motor vehicle operation is initiated when the seat belts have not been properly fastened. However, such known monitoring systems have been so annoying to vehicle occupants that they have frequently been removed from the vehicle or otherwise circumvented to alleviate these annoyances. As a result the provision of such systems on motor vehicles have not been adequately effective in encouraging use of seat belts.

It is an object of this invention to provide a novel and improved seat belt monitoring system; to provide such a system which is effective to encourage more widespread use of seat belts in motor vehicles; to provide such a system which provides an effective reminder that seat belts should be used at the moment that vehicle operation is initiated but which is not so annoying that steps are likely to be taken to circumvent the monitoring system; and to provide such a system which is of compact, versatile, and economical construction and which can be operated with minimal drain on automotive power supply systems.

Other objects, advantages and details of the novel and improved seat belt monitoring system of this invention appear in the following detailed description of preferred embodiments of the invention, the detailed description referring to the drawings in which.

Figure 1:
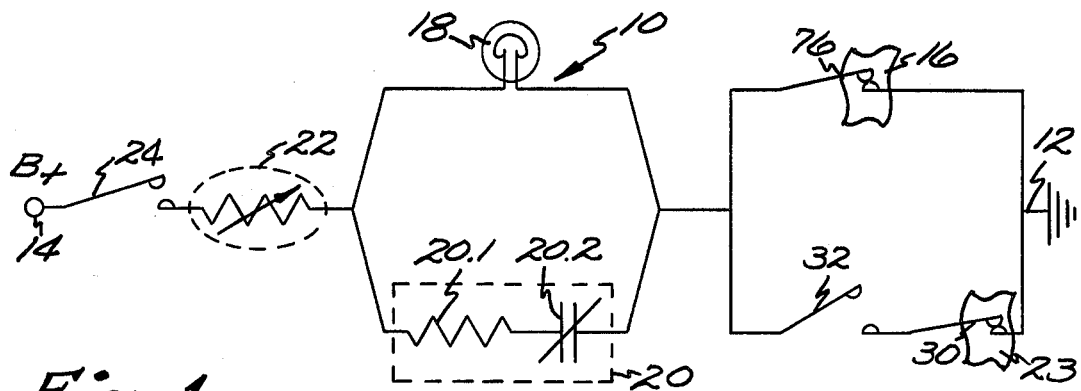
FIG. 1 is a schematic view of a preferred embodiment of this invention.

Referring to the drawings, 10 in FIG. 1 indicates a preferred embodiment of the novel and improved automotive seat belt monitoring system of this invention which is adapted for use in monitoring seat belt usage in an automobile or other motor vehicle (diagrammatically indicated as the electrical ground 12 in FIG. 1) where the vehicle has an electrical power supply B+ as diagrammatically indicated in FIG. 1 by the terminal 14 and has seat belt means diagrammatically indicated at 16 in FIG. 1. As shown, the monitoring system 10 of this invention includes an electrically operable visual signaling means 18 such as an electrical lamp. As will be understood, the lamp 18 is adapted to be mounted on the dashboard of the motor vehicle 12 or in any other location where the light will be readily seen by the vehicle driver and by the passenger occupants of the vehicle. The system 10 then further includes an electrically operable audible signaling means 20 which preferably comprises any conventional electrically operable buzzer system. Typically, for example, the electrical signaling means 20 comprises a coil 20.1 which provides a magnetic field when energized and a pair of normally closed electrical contacts 20.2, one of which is of spring leaf type adapted to be alternately attracted by the noted magnetic field to open the coil circuit and then to be resiliently biased back to a closed circuit position after the coil circuit has been opened, thereby to reclose the circuit, the opening and closing of the contacts providing a buzzing sound in well known manner. Such buzzer systems are well known, and as other conventional electrically operable audible signaling means can be used in the monitoring systems of this invention, the signaling means 20 is not further described herein.

In accordance with this invention, the visual signaling means 18 and the audible signaling means 20 of the system 20 are electrically connected in parallel with each other and are connected in series with a resistor means 22 of positive temperature coefficient of resistivity. Preferably, for example, the resistor means 22 comprises a ceramic-type resistor element which is adapted to display a relatively low resistance at a selected normal temperature such as room temperature but is adapted to be electrically self-heated by directing electrical current through the resistor and to display a very sharp increase in resistivity when heated to a predetermined operating temperature for reducing current flow through the resistor element to a very low level. Typically, for example, the resistor element 22 incorporates a thin disc-like layer of a lanthanum-doped barium titanate ceramic material having metallized contact surfaces on opposite side surfaces of the ceramic layer, such as resistor element typically displaying low resistance on the order of 5 to 10 ohms per resistor unit at room temperature but being self-heated to an operating temperature on the order of 90°C. within a predetermined period of time on the order of 10 to 15 seconds when energized at about 12 volts to display a sufficiently high resistance on the order of 1000 ohms or more to reduce current flow through the resistor element to a level which is just sufficient to maintain the resistor element at said operating temperature. That is, the resistor element is adapted to be self-regulating to prevent excessive overheating of the resistor element when energized. As such ceramic resistor elements are well known, the resistor element 22 is not further described herein and it will be understood that the resistor element 22 is selected so that, when at its normal temperature the resistor permits sufficient current flow through the resistor to operate the signaling means 18 and 20 but so that, when at its heated operating temperature, the current permitted to flow through the resistor is insufficient to operate either the visual signaling means 18 or the audible signaling means 20. In accordance with this invention, the seat belt monitoring system 10 further includes a first switch means 24 which is adapted to be operable in any conventional manner in response to initiation of operation of the motor vehicle 12 to electrically connect the resistor 22 and the signaling means 18 and 20 to the electrical power supply 14 of the motor vehicle as is illustrated in FIG. 1. Typically, the switch means 24 comprises a normally open switch as illustrated in FIG. 1. For example, the switch 24 preferably comprises the ignition switch of the noted motor vehicle but can also comprise a switch operable in well known manner by the shifting of a transmission control from a parked position to one of the vehicle transmission drive positions.

In accordance with this invention an addtional switch means 26 which is operable in response to fastening of the automotive seat belt means 16 in the noted motor vehicle to prevent operation of at least the audible signaling means 20 of the monitoring system 10. Typically, for example, the switch means 26 comprises a normally closed switch as is conventionally provided in seat belt mechanisms and which is adapted to be opened when the seat belt is fastened around an occupant of the motor vehicle, the switch being electrically connected to one side to both of the signaling means 18 and 20 and at its opposite side to the electrical ground 12 of the motor vehicle as illustrated in FIG. 1. Preferably, the switch 26 is adapted to be operated upon fastening of the seat belt allotted to the driver of the motor vehicle.

In the monitoring system 10 above-described, the switch 24 is closed upon initiation of operation of the motor vehicle 12 (as by closing of the ignition switch of the vehicle) for electrically connecting the battery or other electrical power supply 14 of the vehicle to the resistor 22 and to the signaling means 18 and 20. If the driver has properly fastened his seat belt before initiating motor vehicle operation, the switch 26 is opened by the act of fastening the seat belt means 16 and operation of the signaling means 18, 20 is therefore prevented. However, if the vehicle driver has not properly fastened his seat belt before initiating motor vehicle operation, closing of the first switch means 24 is effective to energize each of the signaling means 18 and 20 through the normally closed switch 26 to electrical ground 12 for giving visual and audible indication to the driver that his seat belt is not properly fastened. If the driver then properly fastens his seat belt for opening the additional switch means 26, operation of the signaling means 18, 20 is thereafter prevented. However, if the vehicle driver ignores the visual and audible indication given by the signaling means 18 and 20 and permits his seat belt to remain unfastened, the signaling means 18 and 20 continue to operate and electrical current flows through the resistor element 22 of positive temperature coefficient of resistivity. After a selected time delay, which time delay is on the order of 10 to 15 seconds in the example previously described, the resistor element 22 is heated to its predetermined operating temperature and its resistivity increases to the point where the current permitted to flow through the resistor element becomes insufficient to operate either of the signaling means 18 or 20, thereby terminating operation of these signaling means. The monitoring system 10 then remains in this condition with both of the signaling means prevented from operation by the resistor element 22 but, as the resistor element 22 draws very little current in its heated operating temperature mode, the monitoring system 10 thereafter imposes only an insignificant drain on the electrical power supply 14 of the motor vehicle. In this way, the vehicle driver is properly reminded to fasten his seat belt 16 immediately after initiation of operation of the motor vehicle 12 and is furnished with both visual and audible signaling means for reminding him of this seat belt condition. However, the signaling means are adapted to be terminated in their operation within a brief time delay after said initiation of motor vehicle operation, thereby to avoid such annoyance of the vehicle operator as would be likely to induce him to remove the monitoring system from the vehicle or to otherwise circumvent the monitoring system.

If desired, as illustrated in FIG. 1, where the motor vehicle 12 includes additional passenger seat belt means 28 and passenger sensing switch means 32, a passenger seat belt switching means 30 is arranged in series with the sensing switch means 32 as shown in FIG. 1. As illustrated, the passenger sensing switch means 32 preferably comprise normally open switch means while the passenger seat belt switch means 30 preferably comprise normally closed switch means, these switch means 30 and 32 being arranged in series with each other and in parallel with the switch means 26 previously described. In this arrangement, both the visual and audible signaling means 18 and 20 are adapted to be operated for providing visual and audible signals even when the driver has properly fastened his seat belt unless the passenger seat belt 28 has also been properly fastened. That is, where the passenger sensing switch means 32 indicates a passenger occupant is present in the motor vehicle by closing of the switch means 32, the circuit from the power supply 14 through the audible and visual signaling means 18, 20 is closed through the switch means 32 unless the switch means 30 has been opened by proper fastening of the seat belt 28 as will be understood.

Figure 2:
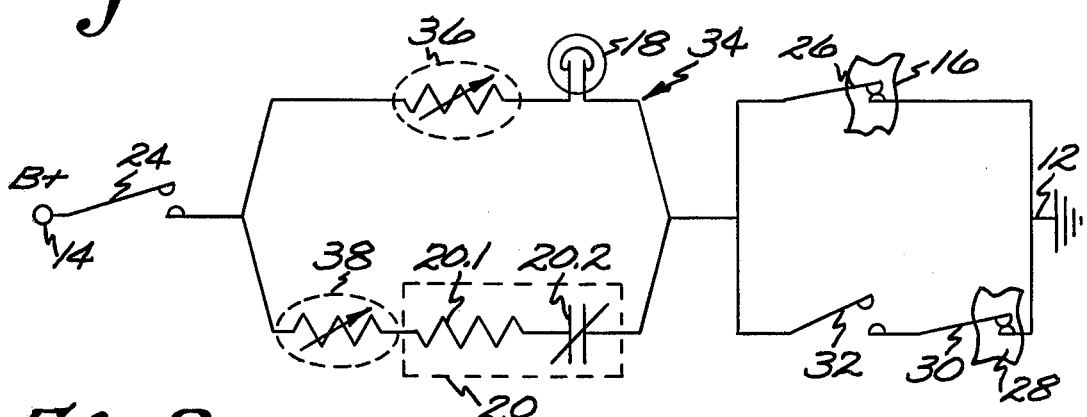
FIG. 2 is a schematic view of another preferred embodiment of this invention.

In another alternate preferred embodiment of the monitoring system of this invention as indicated at 34 in FIG. 2, wherein components of the system 34 corresponding to components of the system 10 are identified by corresponding reference numerals, the resistor element 22 of positive temperature coefficient of resistivity as shown in FIG. 1 is replaced in the monitoring system 34 by two resistor elements 36 and 38 of corresponding positive temperature coefficient of resistivity characteristics. These resistor elements 36 and 38 are disposed in series with the visual and audible signaling means 18 and 20 respectively. Accordingly, by a proper proportioning of the resistor elements 36 and 38 relative to the signaling means, the resistor elements are adapted to terminate operation of the visual and audible signaling means with different time delays after initiation of operation of the motor vehicle 12 as will be understood.

Figure 3:
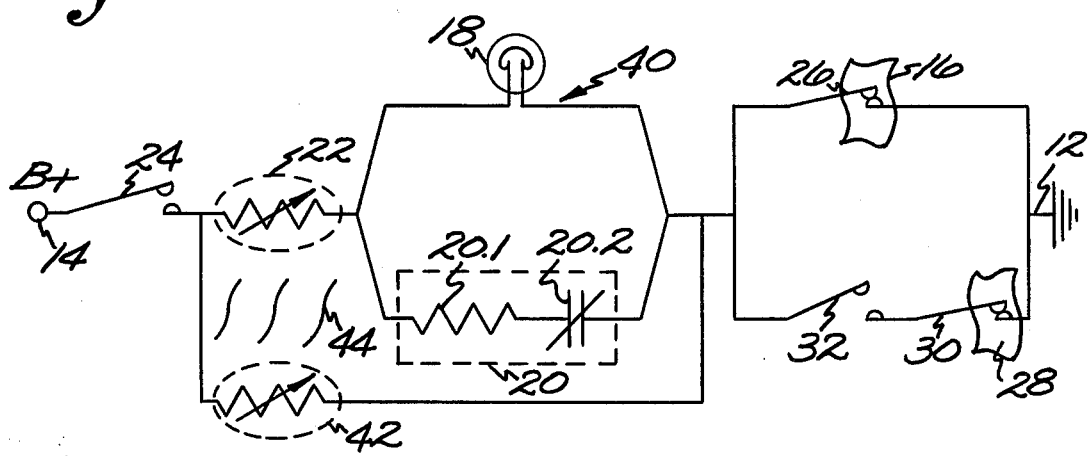
FIG. 3 is a schematic view of another preferred embodiment of this invention.

In another alternate embodiment of the monitoring system of this invention as indicated at 40 in FIG. 3, wherein components of the system 40 corresponding to components of the system 10 of FIG. 1 are identified by corresponding reference numerals, an additional resistor element 42 of positive temperature coefficient of resistivity is connected across the resistor element 32 and the visual and audible signaling means 18 and 20 as shown in FIG. 3. Preferably, for example, the resistor element 22 utilized in the monitoring system 40 comprises a ceramic resistor element of lanthanum-doped barium titanate material which has a resistance of approximately 3 ohms at normal or room temperature but which, when energized at a voltage on the order of 10 to 16 volts is adapted to be heated to a temperature of approximately 95°C. and to display a resistance of greater than 2000 ohms at said temperature. Similarly, the resistor element 42 utilized in the monitoring system 40 shown in FIG. 3 preferably comprises a lanthanum-doped barium titanate material which has a resistance of approximately 1.9 ohms at normal or room temperature but which, when energized at a voltage on the order of 10 to 16 volts, is adapted to be heated to an operating temperature of approximately 135°C. to display a resistance of approximately 1000 ohms. In accordance with this invention, the resistor element 42 is disposed in a selected heat transfer relation to the resistor element 22 as indicated in FIG. 3 at 44. In this arrangement, when the first switch means 24 are operated in response to initiation of operation of the motor vehicle 12 while the seat belt 6 is not properly fastened so that the switch means 26 are in their normally closed condition, the visual and audible signaling means 18 and 20 are each energized through the resistance element 22 while the resistance element 42 draws a substantial current to be heated rapidly to its operating temperature. In this way, the resistance element 42 serves as an electrical heater for heating the resistance element 22 to its predetermined operating temperature within a more precisely predetermined time delay after initiation of operation of the motor vehicle 12. That is, in the monitoring arrangement illustrated in FIG. 3, the resistor element 42 is adapted to be promptly heated to its operating temperature very quickly after initiation of motor operation so that effects of voltage variations from the power supply and variations in the ambient temperatures to which the resistor elements are subjected provide only very small variations in the time required to heat the resistor element 42 to its operating temperature. Similarly, where the resistor element 22 is heated towards its operating temperature to only a limited extent by the flow of electrical current through the resistor element 22, such voltage variations and ambient temperature variations also contribute to only a limited extent to the heating of resistor 22. In accordance with this invention the major part of the time delay for heating the resistor element 22 to its operating temperature after initiation of operation of the motor vehicle 12 is primarily determined by the heat-transfer relationship established between the resistor element 42 and the resistor element 22. Preferably, the resistor element 42 is disposed in a selected heat transfer relation to the resistor 22 to heat the transfer element 22 to its operating temperature within 4 to 8 seconds after initiation of motor vehicle operation.

Figure 4:
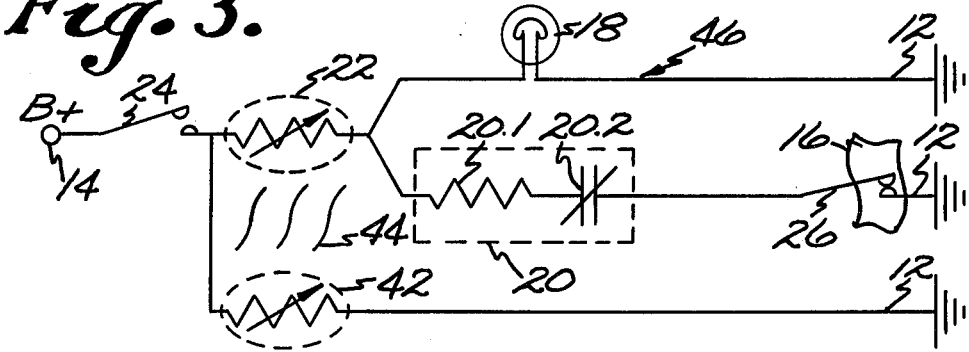
FIG. 4 is a schematic view of another preferred embodiment of this invention.

In another preferred embodiment of the monitoring system of this invention as indicated at 44 in FIG. 4, wherein components of the system 46 corresponding to components previously described with reference to FIG. 3 are identified by corresponding reference numerals, the additional switch means 26 which are operable in response to fastening of the driver seat belt means 16 are arranged to prevent operation of only the audible signaling means 20 when the seat belt means 16 has been properly fastened. That is, as shown in FIG. 4, the visual signaling means 18 is arranged in series relation to the control resistor element 22 to be connected in series between the power supply 14 and electrical ground 12 upon closing of the first switch means 24 after initiation of operation of the motor vehicle 12. Similarly, the audible signaling means 20 is connected in series with the control resistor 22 and with the additional seat belt operated switch means 26 to be electrically connected in series between the power supply 14 and electrical ground when the switch means 24 is closed following initiation of motor vehicle operation. The electrical resistance heater 42 of positive temperature coefficient of resistivity is then arranged to be connected in series between the power supply 14 and the electrical ground 12 upon closing of the switch 24. The resistance heater 42 is disposed in selected heat transfer relation to the resistor 22 as indicated at 44. In this arrangement, if motor vehicle operation is initiated for closing the switch 24 while the vehicle operator seat belt 16 is improperly fastened, the visual and audible signaling means 18 and 20 are each energized from the power supply 14 through the resistor element 22 at the same time the resistor element 42 is rapidly heated towards its operating temperature. If the vehicle driver then properly fastens his seat belt 16 for opening the normally closed switch means 26, opening of the switch 26 prevents operation of only the audible signaling means indicating that the driver seat belt has been properly fastened. However, the visual signaling means 18 remains in operating condition until the resistor 22 has been heated to its operating temperature by the electrical resistance heater 42 to terminate operation of the visual signaling means only with a selected time delay after initiation of the motor vehicle operation. In this way, the visual signaling means continues to give a reminder of the vehicle seat belts to other passenger occupants of the vehicle even though the vehicle driver seat belt 16 has been properly fastened. This visual indication continues for a predetermined period of time after initiation of motor vehicle operation whether or not passenger occupants are present in the vehicle but, because of the fact that the continuing reminder of the seat belts is visual, there is no annoyance to the vehicle driver or to the passenger occupants. As a result, the monitoring system 46 illustrated in FIG. 4 comprises an extremely effective and an extremely compact, reliable, versatile and inexpensive seat belt monitoring system.

It should be understood that although particular embodiments of the monitoring systems of this invention have been described by way of illustrating the invention, this invention includes all modifications and equivalents of the described embodiments falling within the scope of the appended claims.

I claim:

1. A seat belt monitoring system for a motor vehicle having seat belt means and electrical power supply means comprising electrically operable audible signaling means, electrically operable visual signaling means, first switch means operable in response to initiation of motor vehicle operation for electrically connecting said signaling means to said power supply means to permit operation of said signaling means, additional switch means operable in response to fastening of said seat belt means to prevent operation of at least one of said signaling means when said seat belt means is fastened, and electrical resistor means adapted to display selected change in resistivity with a selected temperature change arranged to be subjected to said selected temperature change within a selected time in response to initiation of said motor vehicle operation for preventing operation of at least a selected signaling means of said system after said selected time.

2. A seat belt monitoring system for a motor vehicle having seat belt means and electrical power supply means comprising electrically operable audible signaling means, electrically operable visual signaling means, first switch means operable in response to initiation of motor vehicle operation for electrically connecting said signaling means to said power supply to permit operation of said signaling means, additional switch means operable in response to fastening of said seat belt means to prevent operation of at least said audible signaling means when said seat belt means is fastened, and a resistor means of positive temperature coefficient of resistivity which displays a sharp increase in resistivity in response to heating of said resistor means to a selected temperature, said resistor means being disposed in series with said power supply and at least said audible signaling means and being arranged to be heated to said selected temperature with a selected time delay after said initiation of said motor vehicle operation for thereafter preventing operation of said audible signaling means even when said seat belt means is not fastened.

3. A seat belt monitoring system as set forth in claim 2 wherein said visual signaling means is electrically connected in series with said resistor means and in parallel with said audible signaling means.

4. A seat belt monitoring system as set forth in claim 3 wherein said resistor means comprises a resistor element of said positive temperature coefficient of resistivity and said audible signaling means and said visual signaling means are electrically connected in series with said resistor element.

5. A seat belt monitoring system as set forth in claim 3 wherein said resistor means comprises a pair of resistor elements of said positive temperature coefficient of resistivity, said audible signaling means and said visual signaling means each being electrically connected in series with one of said resistor elements.

6. A seat belt monitoring system as set forth in claim 2 wherein said additional switch means comprises switch means operable in response to fastening of a single seat belt on said motor vehicle.

7. A seat belt monitoring system as set forth in claim 2 wherein said additional switch means comprises a driver switch means operable in response to fastening of a seat belt for a vehicle driver to prevent operation of said audible signaling means and passenger switch means electrically connected in parallel with said driver switch means operable in response to fastening of a seat belt for a vehicle passenger to prevent operation of said audible signaling means.

8. A seat belt monitoring system as set forth in claim 7 wherein sensing switch means are connected in series with said passenger switch means and operable in response to the presence of a passenger in said motor vehicle to permit operation of said passenger switch means to prevent operation of said audible signaling means.

9. A seat belt monitoring system for a motor vehicle having seat belt means and electrical power supply means comprising electrically operable audible signaling means, electrically operable visual signaling means, first switch means operable in response to initiation of motor vehicle operation for electrically connecting said signaling means to said power supply to permit operation of said signaling means, additional switch means operable in response to fastening of said seat belt means to prevent operation of at least said audible signaling means when said seat belt means is fastened, a resistor means of positive temperature coefficient of resistivity which displays a sharp increase in resistivity in response to heating of said resistor means to a selected temperature, said resistor means being disposed in series with said power supply and at least said audible signaling means to prevent operation of said audible signaling means when said resistor means is heated to said selected temperature, and electrical heater means disposed in selected heat-transfer relation to said resistor means and operable in response to initiation of said motor vehicle operation to heat said resistor means to said selected temperature with a selected time delay after initiation of said motor vehicle operation.

10. A seat belt monitoring system as set forth in claim 9 wherein said electrical heater means comprises a self-regulating resistance heater element of positive temperature coefficient of resistivity.

11. A seat belt monitoring system as set forth in claim 10 wherein said self-regulating heater element is electrically connected in parallel to said resistor means.

12. A seat belt monitoring system for a motor vehicle having seat belt means and electrical power supply means comprising a first resistor of positive temperature coefficient of resistivity which displays a sharp increase in resistivity when heated to a predetermined operation temperature for reducing electrical current flow through said first resistor to a very low level, an electrically operable visual signaling means electrically connected in series with said first resistor, an electrically operable audible signaling means electrically connected in series with said first resistor and in parallel with said visual signaling means, first switch means operable in response to initiation of operation of said motor vehicle for electrically connecting said first resistor and said signaling means to said power supply for permitting operation of said signaling means, additional switch means in series with said audible signaling means operable in response to fastening of said seat belt means to prevent operation of said audible signaling means when said seat belt means is fastened, and a second electrical resistor of positive temperature coefficient of resistivity adapted to be heated to a predetermined operating temperature by directing electrical current therethrough and to display a sharp increase in resistivity at said predetermined operating temperature for reducing current flow through said second resistor to a very low level, said second resistor being electrically connected in parallel to said first resistor to be electrically connected to said power supply upon operation of said first switch means for heating said second resistor to said predetermined operating temperature for said second resistor, said second resistor being disposed in selected heat-transfer relation to said first resistor for heating said first resistor to said predetermined operating temperature of said first resistor within a selected period of time after initiation of said motor vehicle operation to prevent operation of said audible and visual signaling means after said period of time.

13. A seat belt monitoring system as set forth in claim 12 wherein said additional switch means comprises normally closed switch means operable to an open circuit position in response to fastening of said seat belt means.

* * * * *